United States Patent Office 3,007,480
Patented Nov. 7, 1961

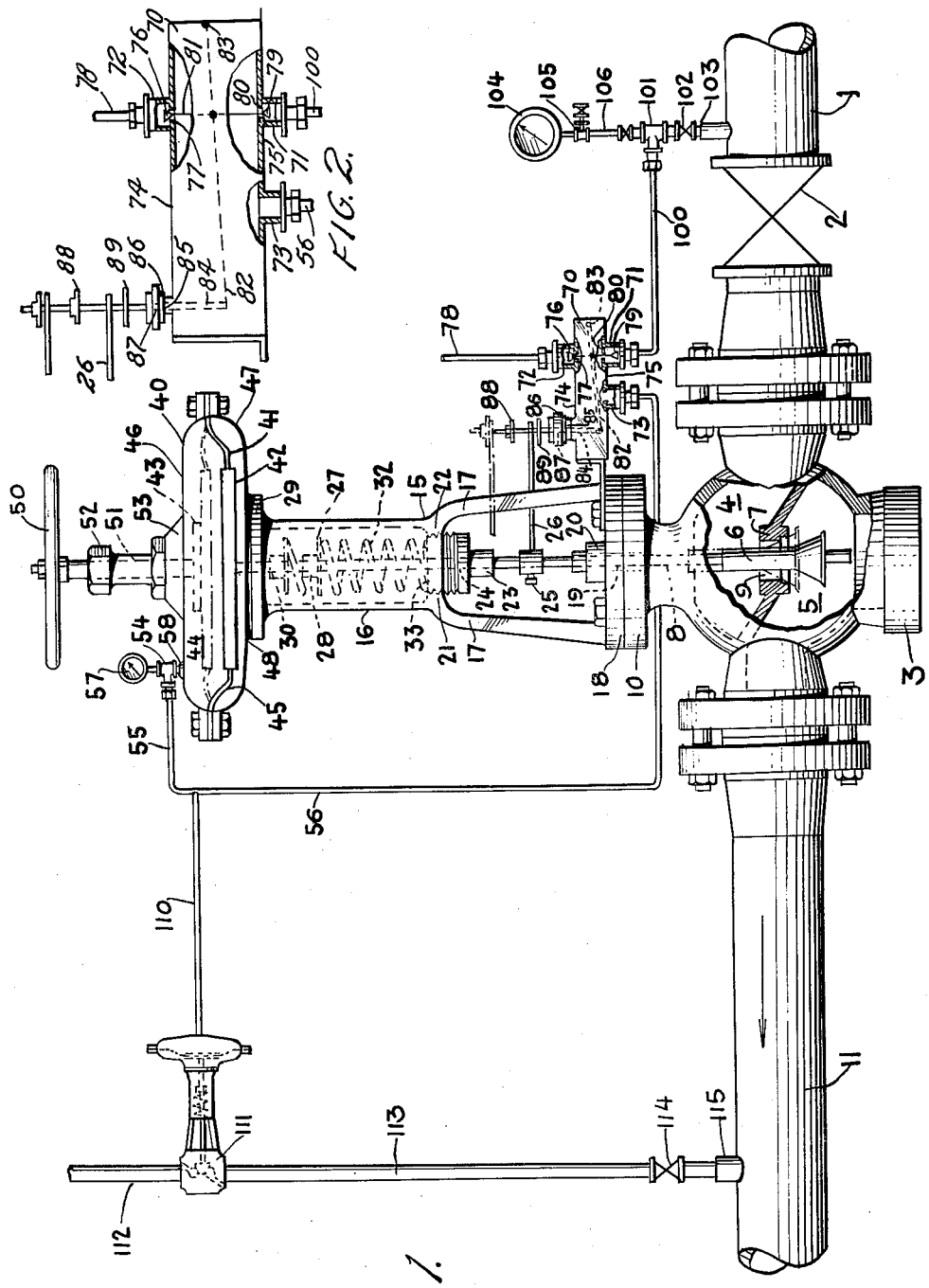

3,007,480
SAFETY SHUT-OFF DEVICE
Frederick I. Stalnecker, Lake Charles, La., assignor to Cities Service Refining Corporation, Lake Charles, La., a corporation of Delaware
Filed Sept. 8, 1958, Ser. No. 759,600
5 Claims. (Cl. 137—102)

This invention relates to safety shut-off devices for use in pressure gas lines such as the fuel supply lines to a gas-fired boiler and more particularly to a device which operates automatically to shut off the supply of gas to a burner upon loss of supply line pressure and which must be manually reset to restore operation of the burner.

An object of this invention is to provide a safety shut-off device which closes automatically upon loss of supply line pressure and which must be manually reset.

Another object of this invention is to provide a safety shut-off device which is reliable, efficient in operation and is simple to construct.

Still another object of this invention is to provide a safety shut-off device to automatically shut off fuel gas in gas fired boilers upon loss of main supply line pressure by use of a three-way reversing pilot valve.

Briefly, my invention contemplates the provision of a spring operated, diaphragm containing control valve for pressure gas supply lines in which should the pressure of the supply line gas drop below a pre-determined point, the pressure on the diaphragm decreases thereby permitting the spring to close the main valve. A three-way reversing valve is connected to the valve stem of the main valve in such a way that the closing of the main valve results in the opening of this valve's venting port and a simultaneous closing of its gas supply line port. The connection is such that the reverse occurs on the opening of the main valve. The three-way reversing valve is connected by way of a port to the atmosphere, by another port to the gas supply line and by still another port to the diaphragm pressure chamber of the main valve. This enables gas to pass through this valve to the pressure chamber of the main valve to hold the valve open and upon a decrease in pressure resulting in the closing of the main valve and gas supply port, permits gas to flow from the pressure chamber of the main valve through this valve to the atmosphere. This device is returned to operating position by manually reopening the main valve thereby opening the three-way reversing valve supply port and closing the venting port.

These and other aspects of this invention may be more completely understood in light of the following detailed description taken in conjunction with the accompanying drawing in which:

FIGURE 1 is a vertical cross sectional view of the safety shut-off device when the device is operating.

FIGURE 2 is an enlarged view of the reversing valve portion of the safety device.

Referring to the drawings in detail, reference numeral 1 designates a pressure gas supply line to which is connected a main valve body 3, having an inlet chamber 4 and an outlet chamber 5. Valve body 3 has an opening 8 in the upper portion thereof. Valve body 3 is also connected to burner supply line 11. Valve seats 7 are mounted in valve body 3 so as to divide valve body 3 into inlet chamber 4 and outlet chamber 5. Valve member 6 is adapted to engage valve seats 7 thereby closing gas flow passageway 9. The valve illustrated in the drawing is the preferred embodiment of this invention, however, any quick closing control valve may be used.

Plug cock valve 2 is installed in gas supply line 1 a short distance upstream of valve body 3. This valve may be any conventional plug cock valve.

A standard 15 consisting of a body portion 16, legs 17 and a base 18 is installed on valve body 3 by attaching base 18 to the upper end 10 of valve body 3. The base 18 of standard 15 has an opening 19 therein positioned directly above opening 8 in valve body 3. Stuffing 20 or other means is secured to opening 19 to prevent escape of any gas from valve body 3 by way of openings 8 and 19. The interior of body portion 16 of standard 15 is hollow. Secured to the lower end 21 of body portion 16 is a spring receiving member 22. Member 22 and the lower end 21 of portion 16 are correspondingly threaded to enable installation of member 22. An opening 24 is provided in member 22 directly above the openings 8 and 19. Stuffing 23 or other means is provided for member 22 to seal the interior of portion 16 from the atmosphere.

A pressure motor 40 composed of an upper casing 46 and a lower casing 47 is mounted on the upper end 29 of standard body portion 16. Opening 48 is provided in lower casing 47 directly above opening 19. Diaphragm 41 including diaphragm plate 42 separates the interior of pressure motor 40 into an upper chamber 44 and a lower chamber 45. Casing 46 has a raised portion 53 in its center adapted to receive a hand wheel housing 52.

Hand wheel 50 is installed in housing 52 by way of connecting rod 51. Attached to the lower end of rod 51 is a pressure plate 43. Stuffing or other means is placed in housing 52 to prevent the escape of any gas that might be in chamber 44.

A stem 30 is connected to the underside of diaphragm plate 42 and the upper end of valve member 6. Stem 30 passes through openings 8, 19, 24 and 48 and through stuffings 20 and 23. Stem 30 is of sufficient length to permit opening or closing of flow passageway 9 by the upward or downward movement of diaphragm 41.

A spring 32 is placed on the upper end 33 of a spring receiving member 22 and around stem 30. Spring 32 extends upwardly to plate 27 which is secured to stem 30 by screw 28. Spring 32 is chosen for the proper operating characteristics of the device which will be more fully explained in connection with the operation of my invention.

Referring to FIGURE 2, valve 70 is a cylindrical three-way pilot or reversing valve, and includes an inlet port 71 and two outlet ports 72 and 73. Outlet port 72 and inlet port 71 are on the top 74 and bottom 75 respectively at one end of valve 70. The outer outlet port 73 is on the bottom 75 of the other end of valve 70.

Valve member 76 positioned in port 72 is adapted to contact valve seat 77 to close port 72 and prevent venting by way of line 78. Valve member 79 is positioned in port 71 and adapted to contact valve seat 80 to close port 71. Members 76 and 79 are attached to arm 82 by links 81. Arm 82 extends lengthwise through the interior of valve 70 and is connected to pivot 83 mounted upon the end of valve 70 nearest to ports 71 and 72 and stem 84 which extends downwardly through opening 85 into valve 70. Opening 85 is closed by coupling 86 which has an opening 87, in the center thereof to permit movement of stem 84, but to prevent escape of any gas from valve 70.

Attached to stem 84 outside of coupling 87 are plates 88 and 89. Positioned between plates 88 and 89 is linkage 26 which encircles stem 84 and extends from stem 84 to stem 30 and is rigidly attached to stem 30 by screw 25. Linkage 26 is illustrated as encircling stem 84, however, changes may be made in the construction of linkage 26 such as fashioning it in such a manner that it can be inserted in a slot provided in stem 84 which change would not necessitate the use of plates 88 and 89. Linkage 26 is fixed to stem 30 at a point where the upward or downward movement of stem 30 and opening or closing of flow passageway 9 will correspondingly result in the upward or downward movement of stem 84 and arm 82.

Referring once more to FIGURE 1, port 71 is connected to T 101 by line 100, thus connecting valve 70 to supply line 1 through valve 102 and line 103. A standard pressure gauge 104 is connected to T 101 through bleed valve 105 by line 106. Port 73 of valve 70 is connected to chamber 44 through T 54 by way of lines 55 and 56. A pressure gauge 57 is provided on T 54. T 54 is connected to opening 58 in casing 46, thereby connecting valve 70 with chamber 44 of pressure motor 40.

In the preferred embodiment of this invention, an additional quick closing diaphragm operated valve is made a part of my safety shut-off device. Diaphragm operated valve 111 is installed between lines 113 and 112.

Line 112 is open to the atmosphere and line 113 is connected to burner supply line 11 by way of plug cock valve 114 and line 115. Diaphragm operated valve 111 is connected to supply line 1 by line 110 joining line 56.

Prior to start up operation, the device of this invention is installed between pressure gas supply line 1 and burner supply line 11, there being no pressure gas flowing through line 1. Plug cock valve 2 is in a closed position, valve 102 is open and valve 105 is in a closed position. Diaphragm 41 is in a raised position as shown by the dotted lines in pressure motor 40, with the result that valve member 6 engages valve seat 7. Linkage 26 is in a raised position and resting against the underside of plate 88, maintaining stem 84 in its raised position. Arm 82 is connected to stem 84, and is also in a raised position closing port 71 and opening port 72. Plug cock valve 114 and diaphragm operated valve 111 are open.

To set this device in operating position, hand wheel 50 is lowered until plate 43 comes into contact with diaphragm plate 42, forcing the plate downward to the position shown in the drawing. The downward movement of plate 42 results in a corresponding downward movement of stem 30 and valve member 6 and depression of spring 32, thereby opening gas flow passageway 9. Linkage 26 being connected to stem 30 is moved downwardly, thereby coming into contact with plate 89. Continued downward movement of linkage 26 depresses plate 89 thereby moving stem 84 and arm 82 downward thus closing port 72 and opening port 71.

Supply gas under normal operating pressure is introduced into supply line 1. This invention will be described as operating under 50 lbs. p.s.i.g., however, any pressure may be used provided adjustments are made in the various components of this device to compensate for the increase or decrease in pressure. An example of such is the adjustment of the compressibility of spring 32 obtained by upward or downward movement of plate 27.

Gas under pressure flows through line 103, valve 102 and line 100 into three-way valve 70. From valve 70, gas under pressure proceeds out of port 73 to line 56 and line 110 into valve 111 thereby closing valve 111.

The pressure from line 110 continues through line 55, T 54 and opening 58 into the upper chamber 44 of pressure motor 40 to pressurized chamber 44. If valve 111 is omitted from this device, gas under pressure instead of flowing first into line 110 from line 56 will flow directly into line 55. This pressure in chamber 44 is sufficient to maintain diaphragm 41 in its lower or wide open position. Hand wheel 50 is then raised to a position shown in the drawing. The system is then ready for operation upon the opening of plug cock valve 2. This valve when opened permits gas to flow through inlet chamber 4, passageway 9 and outlet chamber 5 into burner supply line 11. Now the system is in operating position.

In the installation of this device the operator must decide what decrease in pressure he wishes the valve to be closed. Once this has been determined, such as for example below 9 p.s.ig., springs 32 and the spring in valve 111 must be adjusted to counteract 9 p.s.i.g. pressures on diaphragm 41 and the diaphragm in valve 111, respectively. Spring 32 and the spring in valve 111 should be so constructed that upon decrease in pressure in chambers 44 and in valve 111, as for example to 15 p.s.i.g., there would be no change in position of the diaphragms, but upon a further decrease in pressure, the springs would force the diaphragms toward their closed positions which is reached when the pressure decreases below the desired point, say 9 p.s.i.g. At this point the springs would have forced the diaphragm 41 and correspondingly valve member 6 to its closed position and opened valve 111.

The distance on stem 84 between plates 88 and 89 through which linkage 26 will travel because of the upward movement of stem 30 should be that which will not permit any movement upward of plate 88 until pressure drops below the desired point, as for example, 9 p.s.i.g. at which point any further movement of linkage 26 occasioned by the upward movement of stem 30 will result in the upward movement of stem 84 and arms 82, thereby closing port 71 and opening port 72.

Assume that the pressure in line 1 decreases to 15 p.s.i.g., the pressure throughout the entire system would drop to 15 p.s.i.g., but no movement of the components of this device would be experienced because spring 32 and valve 111 were adjusted to remain depressed and closed, respectively by 15 p.s.i.g. pressure in chambers 44 and valve 111.

Line 1 pressure continues to drop below 15 p.s.i.g., but above 9 p.s.i.g., resulting in upward movement of stem 30, linkage 26 and valve member 6 directly proportional to the decrease of pressure in chamber 44. Valve member 111 will begin to open at this point. Now linkage 26 will have travelled upwardly to rest against the underside of plate 88. Should the pressure in line 1 and therefore, throughout the device decrease below 9 p.s.i.g., further upward travel of stem 30 will result in linkage 26 raising plate 88, thereby raising stem 84 and arm 82, thus closing port 71 and opening port 72. This allows gas in chambers 44 and valve 111 to flow freely through lines 55 and 110, respectively to line 56, then through line 56, port 73, port 72, line 78 and out to the atmosphere.

This pressure release in chamber 44 will permit any further upward movement in diaphragm 41, diaphragm plate 42 and stem 30, necessary to cause contact of valve 6 with valve seats 7. This decrease in pressure in line 110 will permit the complete opening of valve 111 thereby permitting any gas in lines 11 and 113 to vent to the atmosphere through line 112. The closing of port 71 will prevent any gas in line 1 from entering the device, thereby preventing the reopening of flow passageway 9 until the operator desires to open it. Upon return of the desired pressure in line 1 as will be determined by the use of pressure gauge 104, the operator may wish to return the device to its operating position.

This is accomplished by closing plug cock valve 2 and lowering hand wheel 50 until plate 43, having come into contact with diaphragm plate 42, forces plate 42 downward to its position shown in the drawing thereby moving stem 30 and valve member 6 downward to open the passageway 9. The downward movement of stem 30 will result in the opening of port 71 and the closing of port 72 as herein before explained. The passage of gas from line 1 will hold the diaphragm 41 in its open position and close valve 111. Once this is accomplished valve 2 may be opened and hand wheel 50 raised, placing the device again in its operating position.

Should an emergency arise necessitating closing, or if the operator wishes to test the closing operation of the device, valve 102 should be closed and valve 105 opened. This will permit gas in the device to flow through the device through port 71, line 100, T 101 and line 106 into valve 105 and then to the atmosphere. This will result in the upward movement of diaphragm 41 thereby closing passageway 9 and opening valve 111.

From the foregoing, it is apparent that the present invention provides a novel safety shut-off device stopping the flow of gas to a burner when the pressure decrease below a prescribed point and preventing the gas from flowing beyond the valve should the pressure increase until permitted to do so by the operator, thereby eliminating any danger of explosion or loss of gas.

I have described my invention with a certain degree of particularity. It is of course understood that changes in the details, combinations and arrangements of operations may be resorted to without departing from the spirit and scope of this invention which is limited only by the claims appended hereto.

I claim:

1. A safety shut-off system for use in pressure gas lines comprising a main valve body, said main valve body having a gas flow passageway therethrough, a valve member movably mounted in the valve body to control gas flow in said passageway, a standard mounted on the valve body, a pressure motor mounted on the standard, a flexible diaphragm extending across the pressure motor dividing the pressure motor into upper and lower chambers, a stem joining the valve member to the diaphragm, manually operated means for actuating the valve member, a plug cock valve mounted in the gas line on the upstream side of the main valve body, a reversing valve body associated with the main valve body, said reversing valve body having one inlet port and two outlet ports, said first outlet port connected to a line vented to the atmosphere, said second outlet port connected to the upper chamber of the pressure motor, said inlet port connected to the gas pressure line upstream of the plug cock valve, a valve member movably mounted in the reversing valve body, a link connecting the valve member in the reversing valve body to the main valve stem in such fashion that upon the opening movement of the main valve stem, the reversing valve member simultaneously opens the inlet port and closes the first outlet port and upon the closing movement of the main valve stem, the reversing valve member simultaneously closes the inlet port and opens the first outlet port, and a spring attached to the main valve stem which closes the main valve when the pressure in the upper chamber of the pressure motor decreases to a pre-determined point.

2. A safety shut-off system for use in pressure gas lines comprising a main valve body, said main valve body having a gas flow passageway therethrough, a valve member movably mounted in the valve body to control gas flow in said passageway, a standard mounted on the valve body, a pressure motor mounted on the standard, a flexible diaphragm extending across the pressure motor dividing the pressure motor into upper and lower chambers, a diaphragm plate secured to the diaphragm, a stem joining the valve member to the diaphragm plate, a hand wheel for forcing the diaphragm toward the lower pressure motor chamber, a plug cock valve mounted in the gas line on the upstream side of the main valve body, a reversing valve body associated with the main valve body, said reversing valve body having one inlet port and two outlet ports, said first outlet port connected to a line vented to the atmosphere, said second outlet port connected to the upper chamber of the pressure motor, said inlet port adapted to be connected to the gas pressure line upstream of the plug cock valve, a valve member movably mounted in the reversing valve body, a link connecting the valve member in the reversing valve body to the main valve stem in such fashion that upon the opening movement of the main valve stem, the reversing valve member simultaneously opens the inlet port and closes the first outlet port and upon the closing movement of the main valve stem, the reversing valve member simultaneously closes the inlet port and opens the first outlet port, and a spring attached to the main valve stem and adapted to close the main valve when the pressure in the upper chamber of the pressure motor decreases to a pre-determined point.

3. A safety shut-off system for use in pressure gas lines comprising a main valve body, said main valve body having a gas flow passageway therethrough, a movable valve member installed in the main valve body which blocks the gas flow passageway when activated, a standard mounted on the valve body, a pressure motor mounted on the standard, a flexible diaphragm extending across the pressure motor dividing the pressure motor into upper and lower chambers, a stem joining the valve member to the diaphragm, manually operated means for forcing the diaphragm toward the lower pressure motor chamber, a plug cock valve mounted in the gas line on the upstream side of the main valve body, a reversing valve body associated with the main valve body, said reversing valve body having one inlet port and two outlet ports, said first outlet port connected to a line vented to the atmosphere, said second outlet port connected to the upper chamber of the pressure motor, said inlet port adapted to be connected to the gas pressure line upstream of the plug cock valve, a reversing valve member movably mounted in the reversing valve body, a link connecting the reversing valve member to the main valve stem in such manner that upon the opening movement of the main valve stem, the reversing valve member simultaneously opens the inlet port and closes the first outlet port and upon the closing movement of main valve stem, said member simultaneously closes the inlet port and opens the first outlet port, and a spring attached to the main valve stem which closes the main valve when the pressure in the upper chamber of the pressure motor decreases to a pre-determined point.

4. A safety shut-off system for use in pressure gas lines comprising a main valve body, said main valve body having a gas flow passageway therethrough, a movable valve member mounted in the valve body to control gas flow in said passageway, a standard mounted on the valve body, a pressure motor mounted on the standard, a flexible diaphragm extending across the pressure motor dividing the pressure motor into upper and lower chambers, a diaphragm plate secured to the diaphragm, a stem joining the valve member to the diaphragm plate, a hand wheel for forcing the diaphragm toward the lower pressure motor chamber, a plug cock valve mounted in the gas line on the upstream side of the main valve body, a reversing valve body associated with the main valve body, said reversing valve body having one inlet port and two outlet ports, said first outlet port connected to a line vented to the atmosphere, said second outlet port connected to the upper chamber of the pressure motor, said inlet port connected to the gas pressure line upstream of the plug cock valve, a valve member movably mounted in the reversing valve body, a link connecting the reversing valve member to the main valve stem in such manner that upon the opening movement of the main valve stem, the reversing valve member simultaneously opens the inlet port and closes the first outlet port and upon the closing movement of the main valve stem, the reversing valve member simultaneously closes the inlet port and opens the first outlet port, and a spring attached to the main valve stem which forces the stem upward when the pressure in the upper chamber of the pressure motor decreases to a pre-determined point.

5. A safety shut-off system for use in pressure gas lines comprising a main valve body, said main valve body having a gas flow passageway therethrough, a valve member movably mounted in the valve body to control gas flow in said passageway, a standard mounted on the valve body, a pressure motor mounted on the standard, a flexible diaphragm extending across the pressure motor dividing the pressure motor into upper and lower chambers, a stem joining the valve member to the diaphragm, manually operated means for actuating the valve member, a plug cock valve mounted in the gas line on the upstream side of the main valve body, a reversing valve body associated with the main valve body, said reversing valve body having one inlet port and two outlet ports, said first outlet port connected to a line vented to the atmosphere, said second outlet port connected to the upper chamber of the pressure motor, said inlet port adapted to be connected to the gas pressure line upstream of the plug cock valve, a valve member movably mounted in the reversing valve body, a link connecting the valve member in the reversing valve body to the main valve stem in such manner that upon the opening movement of the main valve stem, the reversing valve member simultaneously opens the inlet port and closes the first outlet port and upon the closing movement of the main valve stem, said member closes the inlet port and opens the first outlet port, a spring attached to the main valve stem which closes the main valve when the pressure in the upper chamber of the pressure motor decreases to a pre-determined point, and a diaphragm operated valve positioned in a line connecting the gas pressure line downstream of the main valve body to the atmosphere, said diaphragm operated valve connected to the second outlet port of the reversing valve body, said diaphragm operated valve being adapted to be closed by the gas pressure on the diaphragm and to be opened by a lack of gas pressure on the diaphragm.

References Cited in the file of this patent

FOREIGN PATENTS 887,468     France _____ Aug. 16, 1943